United States Patent [19]
Takada et al.

[11] Patent Number: 4,928,557
[45] Date of Patent: May 29, 1990

[54] HYDRAULIC TRANSMISSION CONTROLLER WITH COUPLING PRESSURE COMPENSATION

[75] Inventors: Mitsuru Takada, Toyota; Tokuyuki Takahashi, Aichi; Hiroshi Itoh, Toyota, all of Japan

[73] Assignee: Toyota Jidosha Kabushiki Kaisha, Japan

[21] Appl. No.: 275,511

[22] Filed: Nov. 23, 1988

[30] Foreign Application Priority Data

Dec. 4, 1987 [JP] Japan .................................. 62-306970
Dec. 4, 1987 [JP] Japan .................................. 62-308188

[51] Int. Cl.⁵ .............................................. B60K 41/06
[52] U.S. Cl. ......................................... 74/867; 74/866
[58] Field of Search ......................... 74/866, 867, 868; 192/0.076, 3.58, 3.33, 103 F, 109 F

[56] References Cited

U.S. PATENT DOCUMENTS

| | | | |
|---|---|---|---|
| 3,956,947 | 5/1976 | Leising et al. | 74/866 |
| 3,985,063 | 10/1976 | Lemon | 192/109 F X |
| 4,023,444 | 5/1977 | Murakami | 192/109 F X |
| 4,033,201 | 5/1977 | Saki | 192/109 F X |
| 4,046,162 | 9/1977 | Rodeghiero | 192/109 F X |
| 4,265,346 | 5/1981 | Emmadi | 192/0.076 X |
| 4,283,970 | 8/1981 | Vukovich | 74/866 |
| 4,346,627 | 8/1982 | Kawamoto et al. | 74/868 X |
| 4,633,738 | 1/1987 | Timte | 74/868 X |
| 4,674,364 | 6/1987 | Shindo et al. | 74/867 |
| 4,690,017 | 9/1987 | Taniguchi et al. | 74/866 |
| 4,729,265 | 3/1988 | Sugano | 74/868 |
| 4,730,521 | 3/1988 | Hayasaki et al. | 74/867 |
| 4,745,826 | 5/1988 | Nishikawa et al. | 74/867 X |
| 4,751,858 | 6/1988 | Iwatsaki | 74/867 |
| 4,781,081 | 11/1988 | Shibata et al. | 74/867 X |

FOREIGN PATENT DOCUMENTS

152961 9/1983 Japan .
188249 12/1985 Japan .
130653 6/1986 Japan .
149657 7/1986 Japan .

Primary Examiner—Dwight G. Diehl
Attorney, Agent, or Firm—Oliff & Berridge

[57] ABSTRACT

A hydraulic control apparatus for controlling a frictional coupling device of an automatic transmission for a motor vehicle includes a shift valve for effecting an engaging action of the coupling device from a first position to a second position, and an accumulator for reducing a change in a hydraulic pressure applied to the coupling device. The control apparatus is adapted to control a control value to regulate a back pressure of the accumulator, based on a parameter associated with an output of an engine, and according to a predetermined relationship between the control value and the parameter, so as to reduce a shifting shock of the transmission. The control apparatus includes a detector for detecting an engaging time of the engaging action of the coupling device. The control apparatus further includes a compensating device for updating the relationship between the control value and the parameter, depending upon the detected engaging time, with respect to a specific value of the parameter at which the engaging action takes place. The compensating device maintains the updated relationship for use for a subsequent engaging action of the coupling device from the first position to the second position.

10 Claims, 9 Drawing Sheets

| SHIFT POSITION | | C1 | C2 | C0 | B1 | B2 | B3 | B0 | F1 | F2 | F0 |
|---|---|---|---|---|---|---|---|---|---|---|---|
| P | | | | ○ | | | | | | | |
| R | | | ○ | ○ | | | ○ | | | | |
| N | | | | ○ | | | | | | | |
| D | 1 | ○ | | ○ | | | | | | ◎ | ◎ |
| D | 2 | ○ | | ○ | ○ | | | | ◎ | | ◎ |
| D | 3 | ○ | ○ | ○ | ○ | | | | | | ◎ |
| D | 4 | ○ | ○ | | ○ | | | ○ | | | |
| 2 | 1 | ○ | | ○ | | | | | | ◎ | ◎ |
| 2 | 2 | ○ | | ○ | ○ | ○ | | | ◎ | | ◎ |
| 2 | 3 | ○ | ○ | ○ | ○ | | | | | | ◎ |
| L | 1 | ○ | | ○ | | | ○ | | | ◎ | ◎ |
| L | 2 | ○ | | ○ | ○ | ○ | | | ◎ | | ◎ |

DETERMINATION OF SHIFTING FROM POSITION "1" TO "2"

SOLENOID-OPERATED SHIFT VALVE S1 IS ACTIVATED TO SHIFT THE TRANSMISSION FROM POSITION "1" TO "2"   151

HYDRAULIC TRANSMISSION CONTROLLER WITH COUPLING PRESSURE COMPENSATION

BACKGROUND OF THE INVENTION

1. Field of the Invention

The present invention relates generally to a hydraulic control apparatus for a hydraulically operated automatic transmission of an automotive vehicle, and more particularly to improvements in such a hydraulic control apparatus, for minimizing shifting shocks of the transmission.

2. Discussion of the Prior Art

An automatic transmission for a motor vehicle incorporates a plurality of hydraulically operated frictional coupling devices such as clutches and brakes, which are controlled by a hydraulic control apparatus, which includes shift valves for shifting the frictional coupling device to selectively establish appropriate shift positions of the transmission. For regulating hydraulic pressures applied to the frictional coupling devices during their engaging actions, the hydraulic control apparatus employs suitable accumulators of a cylinder-and-piston type.

Such an accumulator is adapted to maintain a predetermined optimum hydraulic pressure to be applied to the frictional coupling device for a suitable length of time, so as to reduce the shifting shock of the transmission.

The optimum hydraulic pressure level to be established by the accumulator varies depending upon the torque of the vehicle engine transmitted to the automatic transmission. This optimum pressure level may be controlled by regulating the back pressure to be applied to a back pressure chamber of the accumulator.

In the light of the above, a manner of precisely regulating the back pressure of the accumulator is proposed in laid-open publication No. 61-130653 (published in 1986) of unexamined Japanese Patent Application, wherein the duty cycle (ratio of the ON time to the OFF time) of a solenoid-operated accumulator control valve unit for regulating the back pressure of the accumulator is controlled depending upon the currently detected opening of a throttle valve of the vehicle engine.

Described more specifically, the hydraulic control apparatus uses a predetermined relationship between the optimum duty cycle of a solenoid valve of the accumulator control valve unit and the throttle opening, and controls the duty cycle of the solenoid valve according to this predetermined relationship. Accordingly, the duty cycle is fixed for a specific angle of opening of the throttle valve, whereby the back pressure of the accumulator is fixed for that specific throttle opening. Accordingly, the hydraulic pressure which is established by the accumulator is fixed when the frictional coupling device is shifted with the same throttle opening. Refer to FIGS. 7(A)-7(D).

In the actual operating conditions of the automatic transmission, the engine torque varies to a relatively large extent, depending upon the engine speed, temperature and pressure (supercharger pressure) of the intake air into the engine, and other factors, even when the throttle opening is held constant. Accordingly, the established back pressure of the accumulator tends to fluctuate off the optimum level.

A solution to the above drawback is proposed for example in laid-open publication No. 61-149657 (published in 1986) of unexamined Japanese Patent Application. The proposed solution is adapted to intricately regulate the back pressure of the accumulator, based on not only the throttle opening, but also various other operating parameters or factors such as the temperature of the working fluid in the automatic transmission, temperature of the intake air into the engine, engine speed, and supercharger pressure.

However, there inherently exist variations or fluctuations of the operating parameters that cannot be expected or predicted at the time of designing the hydraulic control apparatus. Further, chronological changes of the operating characteristics of the transmission and engine are inevitably encountered. Therefore, it is difficult to accurately control the hydraulic pressure to be applied to the frictional coupling device, even if the various vehicle running conditions or transmission and engine operating parameters are taken into consideration in controlling the duty cycle of the solenoid valve of the accumulator control valve unit.

For instance, the output torque of the engine inevitably varies with the chronological change of the engine per se, causing operating characteristics of the automatic transmission to be changed, even if the throttle opening, engine speed, and temperature and pressure of the engine intake air are held constant.

Furthermore, the dimensional accuracy and operating characteristics of the valves and accumulators for one transmission differ from those for another transmission of the same construction. This difference results in different optimum levels of the hydraulic pressure applied to the individual transmission units. Even if the transmission units are tuned for consistent operating characteristics at the time of manufacture, the characteristics unavoidably vary during use of the transmission units.

It is also noted that the working fluid in the automatic transmission deteriorates and may contain foreign matters, giving an adverse effect on the flows of the fluid and consequently on the operation of the transmission.

Figure 8:
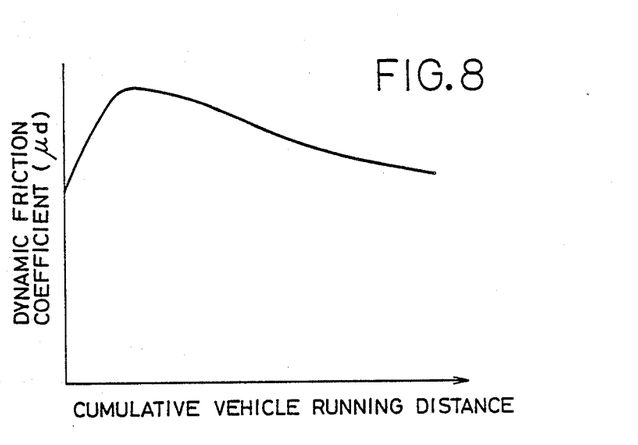
FIG. 8 is a graph indicating a relationship between a cumulative running distance or mileage of the vehicle, and a dynamic friction coefficient of a friction member of the frictional coupling device.

Also, the dynamic friction coefficient of the frictional coupling device of the transmission is lowered due to wear of the coupling device during its use. A graph in FIG. 8 shows a relationship between the cumulative running distance or mileage of the vehicle and the dynamic friction coefficient $\mu d$ of the frictional coupling device. A reduction in the dynamic friction efficient $\mu d$ causes an appreciable change in the operating or shifting characteristics of the friction coupling device.

In the presence of the unexpectable or unforeseeable factors indicated above, it is difficult to obtain a satisfactory degree of consistency in the operating characteristics of the automatic transmission, according to the known hydraulic control arrangement wherein the accumulator back pressure is regulated according to a predetermined relationship between the duty cycle of the accumulator control valve unit and a certain operating parameter or parameters such as the throttle opening.

Figure 9:
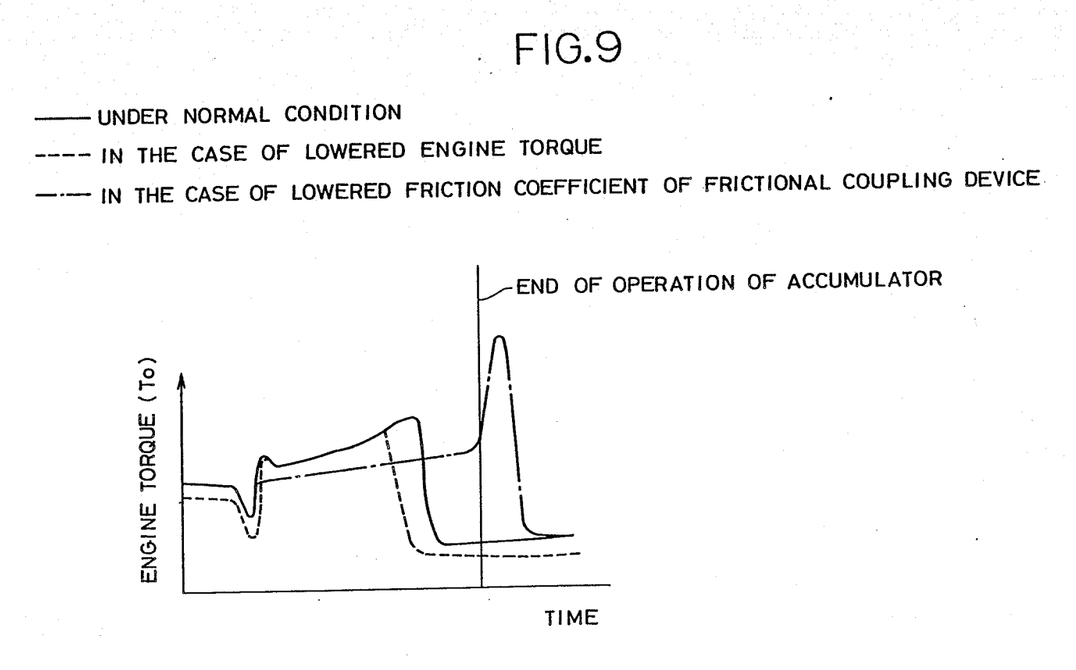
FIG. 9 is a graph illustrating changes in the output shaft torque of the automatic transmission when the transmission is normally operated, when the engine output torque is considerably low, and when the dynamic friction coefficient of the friction member of the frictional coupling device low.

Referring to FIG. 9, the disadvantageous aspect of the known hydraulic control arrangement will be further clarified. Graphs in FIG. 9 show a change in the output shaft torque To of the engine, during a typical shift-up operation of an automatic transmission which occurs when the accelerator pedal of the vehicle is depressed by a considerably large amount. A solid-line curve indicates the torque To while the engine and automatic transmission of the vehicle are operated in a normal condition. A dashed-line curve indicates the torque To when the engine torque level is generally lowered. Further, a curve in one-dot chain line indicates the torque To when the dynamic friction coefficient $\mu d$ of the frictional coupling device of the transmission is lowered.

In the case where the accumulator back pressure is regulated based only on the throttle opening, the hydraulic pressure level established by the accumulator is not changed even if the engine torque is lowered, provided the throttle opening is constant. In this case, a shifting operation of the coupling device occurs at a relatively high rate, and the shifting operation is terminated in a relatiely short time, as indicated by the dashed-line curve of FIG. 9.

In the case where the accumulator back pressure is regulated based on the engine torque itself, the back pressure may be changed with the engine torque However, a reduction in the dynamic friction coefficient $\mu d$ of the frictional coupling device results in a decrease in the torque transmitting capacity of the friction members involved, leading to an increased shifting time of the coupling device, even if the accumulator back pressure is kept constant. In an extreme case, the shifting action of the coupling device is not completed even when the piston of the accumulator reaches its operating end. In this instance, the coupling device is subject to an extremely large shock.

The above-indicated shock arises from a sudden increase in the torque transmitting capacity of the frictional coupling device, immediately after the operating end of the accumulator piston is reached. However, it is very difficult to design the hydraulic control apparatus so as to successfully deal with the reduction in the dynamic friction coefficient $\mu d$ of the frictional coupling device, as described above.

SUMMARY OF THE INVENTION

The present invention was developed in view of the problems experienced in the prior art discussed above. It is therefore an object of the present invention to provide a hydraulic control apparatus for an automatic transmission for a motor vehicle, which is capable of regulating the back pressure of an accumulator for a frictional coupling device of the transmission, so as to suitably deal with unpredictable variations or fluctuations in the operating condition of the vehicle which originate from the manufacture of the vehicle or arise during the use of the vehicle, and so as to thereby assure optimum operating or shifting characteristics of the transmission.

The above object may be achieved according to the principle of the present invention, which provides a hydraulic control apparatus for controlling a hydraulically operated frictional coupling device of an automatic transmission for a motor vehicle, the hydraulic control apparatus including a shift valve for an engaging action of the frictional coupling device from a first position to a second position, and an accumulator for reducing a change in a hydraulic pressure applied to the frictional coupling device during the engaging action, the hydraulic control apparatus being adapted to automatically control a control value to regulate a back pressure of the accumulator, based on a parameter associated with an output of an engine of the vehicle, and according to a predetermined relationship between the control value and the parameter, so as to reduce a shifting shock of the transmission, the hydraulic control apparatus comprising detecting means for detecting an engaging time during which the engaging action of the frictional coupling device from the above-indicated one position to the above-indicated another position is effected, and further comprising compensating means for updating the relationship depending upon the engaging time detected by the detecting means, with respect to a specific value of the parameter at which the engaging action takes place. The compensating means maintains the updated relationship for use for a subsequent occurrence of the engaging action of the frictional coupling device from the first position to the second position.

The hydraulic control apparatus of the present invention constructed as described above is operated on a basic principle wherein the control value to regulate the back pressure of the accumulator is controlled based on a parameter such as the output torque of the engine or an opening of a throttle valve, which reflects a magnitude of a shifting shock of the transmission. However, the relationship between the control value and the parameter used is updated, depending upon the engaging time of the frictional coupling device actually spent in operating the coupling device from one position to another. This compensation or updating of the relationship is accomplished with respect to a specific value of the parameter at which the engaging action takes place. The updated relationship is maintained for use for a subsequent occurrence of the same engaging action.

According to the present invention, therefore, the back pressure of the accumulator during an engaging action of the coupling device from the first position to the second position is regulated depending upon the engaging time actually spent at the preceding occurrence of the same engaging action. Namely, the back pressure of the accumulator may be regulated differently at different occurrences of the same engaging action, even if the parameter value is the same for these occurrences. Accordingly, the hydraulic pressure applied to the frictional coupling device can be adequately controlled by the accumulator, so as to assure consistent engaging characteristics of the coupling device, irrespective of any chronological changes of the automatic transmission, engine and other members of the vehicle.

The back pressure of the accumulator may be regulated by controlling the duty cycle of a solenoid-operated control valve unit adapted to control the pressure applied to the back pressure chamber of the accumulator. In this case, the control value to be controlled to regulate the back pressure is the duty cycle of the solenoid-operated accumulator control unit. Alternatively, the back pressure of the accumulator may be regulated by controlling a current applied to a solenoid of a solenoid-operated proportioning valve unit adapted to control its output pressure applied to the accumulator. In this case, the control value to be controlled is the current applied to the solenoid of the proportioning valve.

In the present hydraulic control apparatus, the back pressure of the accumulator is not controlled in a real-time feedback manner. That is, the relationship updated based on the shifting time of the preceding occurrence of a shifting action of the coupling device is used for the next occurrence of the same shifting action, so as to establish an optimum level of the back pressure of the accumulator, i.e., an optimum level of the hydraulic pressure applied to the coupling device upon the above-indicated next occurrence of the shifting action. Therefore, the present control apparatus does not require a processing unit which is capable of performing arithmetic operations at a relatively high speed.

In one preferred form of the present invention, the compensating means updates the relationship, with respect to an entire range of the parameter, based on the updated relationship obtained with respect to the specific value of the parameter. The compensating means maintains the updated relationship with respect to the entire range of the parameter, for use for the subsequent occurrence of the same engaging action of the coupling device.

If a first occurrence of an engaging action of the frictional coupling device from a first-speed position (low gear position) to a second-speed position (second gear position) takes place with a throttle opening $\theta 1$, the control value to regulate the back pressure of the accumulator upon a second occurrence of the same shifting action is controlled according to the previously updated relationship between the control value and the parameter, only when the second occurrence of the shifting action is effected with the same throttle opening $\theta 1$. However, the updated relationship for the throttle opening $\theta 1$ cannot be utilized for the same engaging action if this engaging action takes place with a different throttle opening $\theta 2$. Therefore, the relationships should be updated with respect to substantially all values of the throttle opening and for all possible engaging actions of the coupling device from one of a plurality of shift positions to another, in order to more effectively control the control value to regulate the back pressure of the accumulator, over the entire range of the throttle opening. Usually, the engaging actions of the coupling device from the first-speed position to the second speed position, or from the second-speed position to the third-speed position frequently occur with relatively small values of the throttle opening. Accordingly, the relationships between the control value and the throttle opening may be properly updated for the relatively small values of the throttle opening, within a relatively short time after the ignition switch of the engine is turned on. However, the engaging actions from the first-speed position to the second-speed position with the throttle valve placed in its fully open position infrequently occur. Therefore, it takes a relatively long time before the relationships for these conditions are properly updated, whereby the transmission is subject to a considerable shifting shock when the coupling device is operated under those conditions.

In the above-described preferred form of the invention, the relationship between the control value and the parameter is updated over the entire range of the parameter, with respect to a given engaging action of the coupling device, based on the relationship updated with respect to the specific value of the parameter at which a first occurrence of the engaging action is effected.

In another form of the invention, the hydraulic control apparatus further comprises a speed sensor for detecting a rotating speed of an input shaft of the automatic transmission or another rotating member rotated with the input shaft, and the detecting means detects a first point of time at which the rotating speed of the rotating member starts to change, and a second point of time at which a change in the rotating speed is terminated. The detecting means determines a time interval between the first and second points of time, as the engaging time of the engaging action. In this case, the rotating member may consist of a turbine of a torque converter disposed between the engine and the frictional coupling device. Alternatively, the rotating member may be a clutch which is incorporated in the frictional coupling device such that the clutch is rotated with the input shaft of the automatic transmission.

In a further form of the invention, the parameter is selected from the group consisting of an opening of a throttle valve of the engine, a reduced pressure in an intake manifold of the engine, a rate of flow of an intake air into the engine, an amount of injection of a fuel into the engine, and an amount of operation of an accelerator pedal of the vehicle.

In a still further form of the invention, the hydraulic control apparatus further comprises a solenoid-operated valve whose duty cycle is controlled to regulate the back pressure of the accumulator, and the control value is an opening of a throttle valve of the engine. In this case, the compensating means updates the relationship between the control value and the parameter, according to the following equation:

$$DSSD1(\theta) = DSSD1(\theta) + (1 - tR/tK) \, DSSD1B$$

where,
DSSD1: duty cycle of the solenoid-operated valve
$\theta$: opening of the throttle valve,
tR: shifting time of the frictional coupling device,
tK: an optimum shifting time of the frictional coupling device,
DSSD1B: a compensation factor of the relationship.

In the above form of the invention, the compensation factor DSSD1B may be a function of the opening of the throttle valve.

In a yet further form of the invention, the hydraulic control apparatus further comprises a speed sensor for detecting a rotating speed of an input shaft of the automatic transmission or another rotating member rotated with the input shaft, and the detecting means is adapted to detect the engaging time of the frictional coupling device, based on a rate of variation in the rotating speed of the input shaft or the rotating member.

BRIEF DESCRIPTION OF THE DRAWINGS

The above and other objects, features and advantages of the present invention will be better understood by reading the following detailed description of presently preferred embodiments of the invention, when considered in connection with the accompanying drawings, in which:

FIG. 6 (B) is a flow chart illustrating a duty-cycle compensating routine for compensating the duty cycle of the duty-cycle control solenoid valve of FIG. 4;

DETAILED DESCRIPTION OF THE PREFERRED EMBODIMENT

Figure 1:
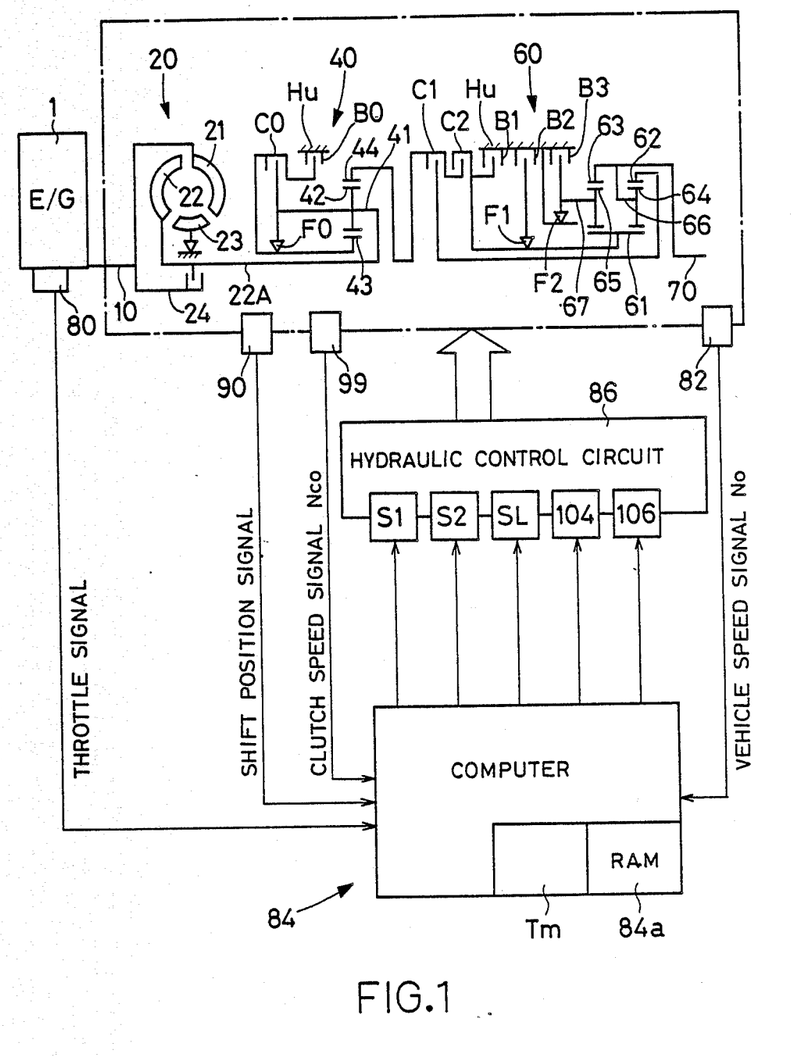
FIG. 1 is a schematic block diagram showing an example of an automatic transmission for a motor vehicle, and one embodiment of a hydraulic control apparatus of the present invention for controlling the automatic transmission.

Referring first to FIG. 1, there is shown a power transmitting system of an automotive vehicle, which includes a hydraulically operated automatic transmission, and a hydraulic control apparatus constructed according to one embodiment of the invention for controlling the automatic transmission.

Figure 2:
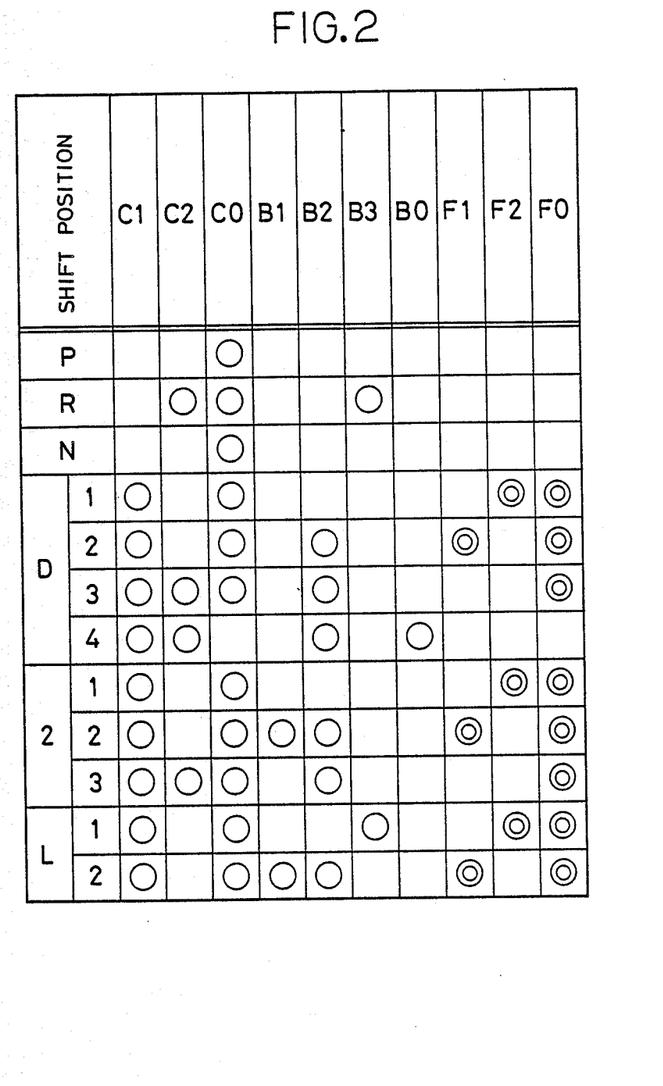
FIG. 2 a view illustrating different operating conditions of the automatic transmission.

The automatic transmission illustrated in a block of one-dot chain line in FIG. 1 includes a torque converter 20, an overdrive mechanism 40, and an underdrive mechanism 60 which has three forward drive positions "1" (1st-speed position), "2" (2nd-speed position) and "3" (3rd-speed position), and one rear drive position "R", as shown in FIG. 2. These three forward drive positions "1", "2" and "3" are established while a manually operated shift lever is placed in one of three positions "L", "2" and "D", with the overdrive mechanism 40 placed in its off position. When the overdrive mechanism 40 is placed in its on position, a fourth forward drive position "4" (4th-speed position) may be established when the manual shift lever is in the position "D".

The torque converter 20 consists of a well known arrangement which is provided with a pump 21, a turbine 22, a stator 23 and a lockup clutch 24.

The overdrive mechanism 40 incorporates a single planetary gear unit consisting of a sun gear 43, a ring gear 44, a planetary pinion 42, and a carrier 41. This planetary gear unit is controlled by a clutch C0, a brake B0 and a one-way clutch F0.

The underdrive mechanism 60 incorporates two planetary gear units which use a common sun gear 61. The first planetary gear unit includes the sun gear 61, a ring gear 62, a planetary pinion 64 and a carrier 66, while the second planetary gear unit includes the sun gear 61, a ring gear 63, a planetary pinion 65 and a carrier 67. The operating condition of these two planetary gear units, and their connection with the overdrive mechanism 40 are controlled by clutches C1, C2, brakes B1–B3 and one-way clutches F1, F2.

Since the automatic transmission indicated above is well known in the art and is schematically illustrated in FIG. 1, no further description thereof is deemed necessary for understanding the principle of the present invention.

Each of the clutches C1, C2 and brakes B1, B2, B3 of the underdrive mechanism 60 is a frictional coupling device of the instant automatic transmission to which the principle of the present invention is applicable.

Figure 11:
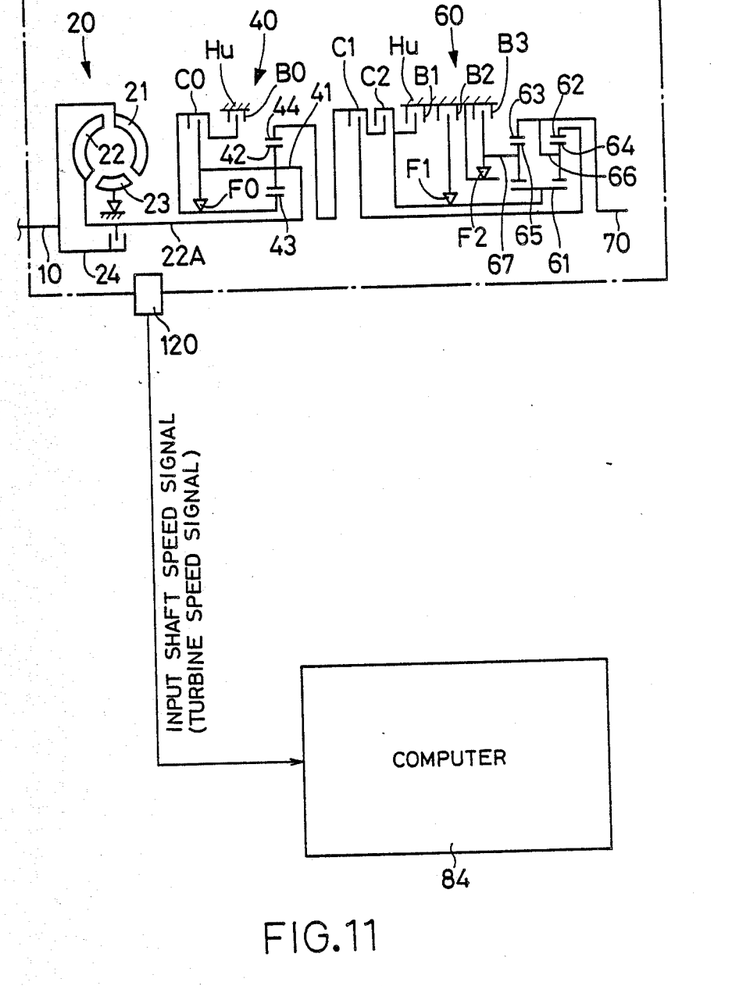
FIG. 11 is a view showing a speed sensor used in a further embodiment of the invention.

The hydraulic control apparatus for controlling the automatic transmission includes a hydraulic control circuit 86, and a hydraulic control device in the form of a computer 84. The computer 84 receives a THROTTLE signal from a throttle sensor 80, a VEHICLE SPEED signal from a vehicle speed sensor 82, a SHIFT POSITION signal from a shift position sensor 90, and a CLUTCH SPEED signal from a clutch speed sensor 99. The THROTTLE signal represents a throttle opening 0 of a throttle valve of the engine 1, which indicates a currently required output (torque) of the engine 1. The VEHICLE SPEED signal represents a running speed No of the vehicle, and the SHIFT POSITION signal represents a currently selected position of the manually operated shift lever. The CLUTCH SPEED signal represents a rotating speed Nco of the drum of the clutch C0 (hereinafter referred to simply as "clutch speed Nco", when appropriate) of the overdrive mechanism 40. However, the clutch speed sensor 120 as shown in FIG. 11, 99 may be replaced by a sensor for detecting a rotating speed of the input shaft 22A of the transmission, which is equal to a rotating speed of the turbine 22 of the torque converter 20.

The clutch speed Nco of the clutch C0 is equal to the rotating speed of the turbine 22 of the torque converter 20 while the automatic transmission is placed in one of the 1st-speed, 2nd-speed and 3rd-speed positions "1", "2" and "3". The clutch speed Nco is zero while the automatic transmission is placed in the 4th-speed position "4". The clutch speed Nco is varied to a considerable extent while the automatic transmission is shifted from one of the 1st-speed, 2nd-speed and 3rd-speed positions to another. Therefore, the commencement and termination of a shifting operation may be detected by sensing the clutch speed Nco of the clutch C0. Consequently, a shifting time of the transmission may be detected or determined.

The hydraulic control circuit 86 includes solenoid-operated shift valves S1, S2 for operating the brake B2 and clutch C2 of the underdrive mechanism 60, and a solenoid-operated valve SL for operating the lockup clutch 24 of the torque converter 20. In response to the THROTTLE, VEHICLE SPEED, SHIFT POSITION, CLUTCH SPEED signals and other signals, the computer 84 controls the solenoid-operated valves S1, S2, and SL, according to a predetermined relation between the throttle opening θ and the vehicle speed No, for controlling the clutches C0–C2, brakes B0–B3 and one-way clutches F0–F2, so as to establish one of the operating positions of the transmission as indicated in FIG. 2, in a manner well known in the art. The hydraulic control circuit 86 further includes duty-cycle controlled solenoid valves 104, 106, which are also controlled by the computer 84, so as to regulate the back pressures of accumulators 116, 118, which will be described.

Figure 3:
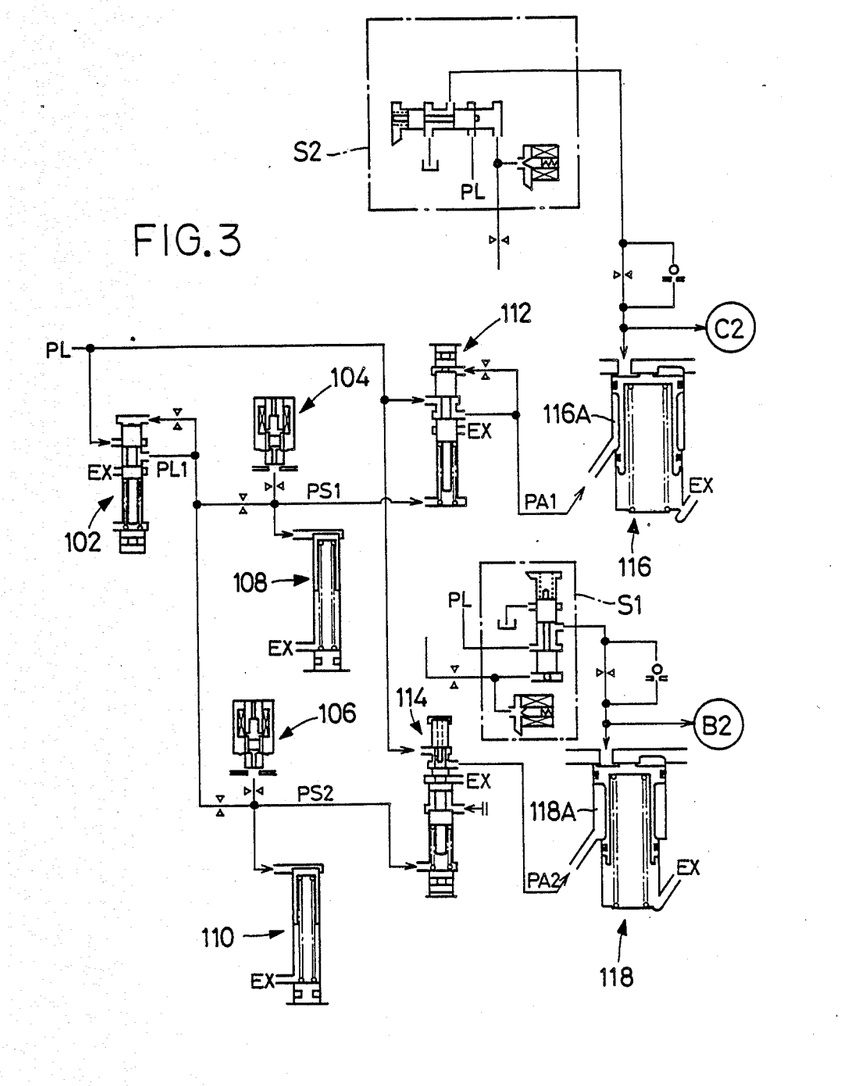
FIG. 3 a fragmentary view of a hydraulic control circuit incorporated in the hydraulic control apparatus.

Referring to FIG. 3, there is shown a part of the hydraulic control circuit 86 which includes the solenoid-controlled shift valves S1, S2, duty-cycle controlled solenoid valves 104, 106 and accumulators 116, 118 indicated above. The circuit 86 further includes a modulator valve 102, two dampers 108, 110, and two accumulator control valves 112, 114 controlled by the solenoid valves 104, 106 for controlling the back pressures of the accumulators 116, 118. The solenoid valve 104 and the accumulator control valve 112 cooperate to constitute a control valve unit for controlling the accumulator 116 for the clutch C2. The solenoid valve 106 and the accumulator control valve 114 cooperates to constitute a control valve unit for controlling the accumulator 118 for the brake B2.

As is known in the art, the modulator valve 102 is adapted to reduce an input line pressure PL to a predetermined level PL1. This reduced pressure PL1 is applied to the duty-cycle controlled solenoid valves 104, 106.

The solenoid valves 104, 106 are turned on and off alternately at a relatively high frequency to reduce the input pressure PL1 to respective duty-cycle controlled pressures PS1, PS2, according to a duty cycle specified by the computer 84. Thus, the duty-cycle controlled pressures PS1, PS2 are controlled by the computer 84, irrespective of a variation in the line pressure PL.

The dampers 108, 110 are adapted to accommodate pressure pulsations of the duty-cycle controlled pressures PS1, PS2, which may arise due to high-speed on/off switching operations of the duty-cycle controlled solenoid valves 104, 106.

The duty-cycle control pressures PS1, PS2 are applied to the respective accumulator control valves 112, 114, so that the line pressure PL also applied to the accumulator control valves 112, 114 is regulated depending upon the duty-cycle controlled pressures PS1, PS2. The accumulator control valves 112, 114 produce controlled output pressures PA1, PA2 to respective back pressure chambers 116A and 118A of the accumulators 116, 118, as the back pressures of these accumulators.

When the automatic transmission is shifted up from the 1st-speed position "1" to the 2nd-speed position "2", the brake B2 of the underdrive mechanism 60 is engaged, as indicated in FIG. 2. At this time, the back pressure PA2 of the accumulator 118 for the brake B2 is optimized, by controlling the duty cycle of the solenoid valve 106 in a manner as described below in detail, by way of example only.

Figure 4:
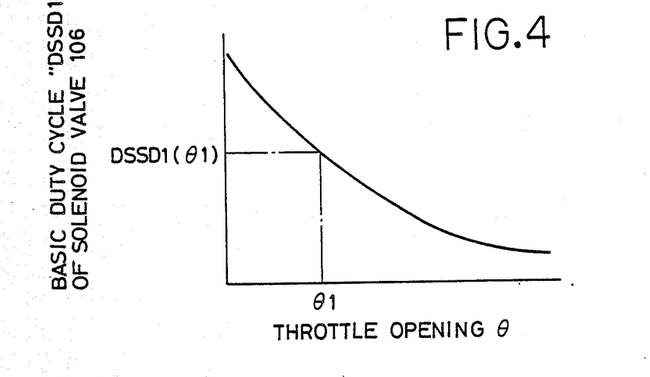
FIG. 4 a graph indicating a basic relationship between a throttle opening of a vehicle engine, and a duty cycle of a duty-cycle controlled solenoid valve for controlling a back pressure of an accumulator for a clutch as a frictional coupling device of the transmission.

The graph in FIG. 4 shows a basic relationship between the duty cycle of the solenoid valve 106 and the throttle opening $\theta$, which basic relationship is used at the time when the duty solenoid 106 is operated upon the first occurrence of the engaging action of the brake B2 after the ignition switch of the engine 1 is turned on. Described more specifically, when the automatic transmission is shifted from the 1st-speed position "1" to the 2nd-speed position "2" for the first time, the computer 84 applies to the solenoid valve 106 a control signal representative of the duty cycle of the duty solenoid 106, based on the specific throttle opening 0 currently detected by the throttle sensor 80, and according to the basic relationship of FIG. 4.

While the present embodiment uses the throttle opening of the throttle valve of the engine 1 as a parameter which represents the currently required output of the engine 1, the throttle opening may be replaced by other parameters such as a vacuum or reduced pressure in an intake manifold of the engine 1, an amount of air intake into the engine 1, an amount of fuel injection into the engine 1, and an amount of operation of an accelerator pedal. Further, the torque of the engine 1 itself may be used as the parameter on which the duty cycle of the solenoid valve 106 is determined.

Figure 5:
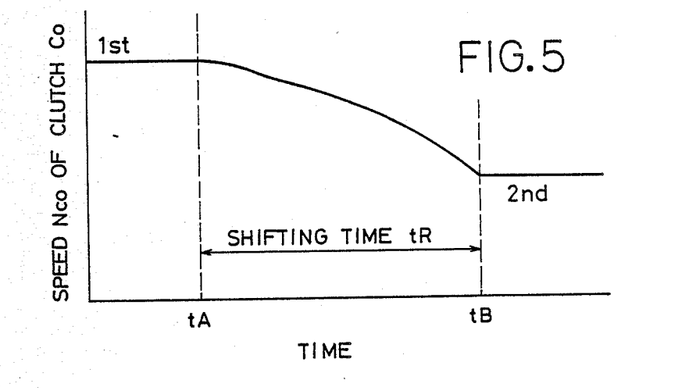
FIG. 5 is a graph indicating a change in a rotating speed of the clutch.

An example of a variation in the speed Nco of the clutch C0 is illustrated in FIG. 5. To detect or measure a length of time tR which is actually spent in shifting the transmission from the 1st-speed position to the 2nd-speed position (time tR necessary for complete engagement of the brake B2), the computer 84 detects a point of time tA at which the clutch speed Nco starts to be lowered, and a point of time tB at which the lowering of the clutch speed Nco is terminated. Namely, the actually required shifting time tR is measured by subtracting the measured time tA from the measured time tB (tR=tB−tA). Based on the detected shifting time tR (engaging time of the brake B2) for the shifting from the 1st-speed position to the 2nd-speed position, the duty cycle DSSD1($\theta$1) of the solenoid valve 106 which corresponds to the throttle opening $\theta$1 is compensated, according the following equation (1):

$$\text{DSSD1}(\theta 1) = \text{DSSD1}(\theta 1) + (1 - tR/tk) \times \text{DSSD1B}(\theta 1) \ldots \quad (1)$$

where,
  tk: basic or optimum time for shifting from the 1st-speed position to the 2nd-speed position
  DSSD1B($\theta$1): compensation factor corresponding to the throttle opening $\theta$1

While the compensation factor DSSD1B($\theta$1) is varied depending upon the throttle opening $\theta$ in the present embodiment, the factor may be a constant value. At the very initial state of the computer 84 (in which even a backup RAM 84a is cleared), the basic duty cycle obtained from the basic relationship of FIG. 4 is used as an initial control value for driving the solenoid valve 106.

The compensated duty cycle DSSD1($\theta$1) is stored in the backup RAM 84a of the computer 84, for controlling the solenoid valve 106, upon the next occurrence of the engaging action of the brake B2 to shift the transmission from the 1st-speed position to the 2nd-speed position, more precisely, upon the next occurrence of the engaging action of the brake B2 with the throttle opening $\theta$1.

At the same time, compensated duty cycle values of the solenoid valve 106 for the same shifting action (from the 1st-speed position to the 2nd-speed position), which correspond to the other values of the throttle opening within its entire range available, are also calculated and stored in the backup RAM 84a. In other words, the relationship between the duty cycle and the throttle opening is updated over the entire range of the throttle opening, so that the updated relationship is used upon the next occurrence of the engaging action of the brake B2. This compensating or updating operation is implemented based on the currently compensated value DSSD1($\theta$1)n which corresponds to the currently detected throttle opening $\theta$1. More particularly, the currently compensated duty cycle DSSD1($\theta$1)n is divided by the duty cycle DSSD1($\theta$1)n-1 corresponding to the throttle opening ($\theta$1) which has been detected in the preceding engaging action of the brake B2. Thus, a compensation ratio K [=DSSD1($\theta$1)n/DSSD1($\theta$1)n-1] is calculated. In the first engaging action of the brake B2, the duty cycle values corresponding to the various values in the entire range of the throttle opening are calculated by multiplying the duty cycle values of the relationship of FIG. 4 by the calculated compensation ratio K. In the second or subsequent engaging actions of the brake B2, the duty cycle values corresponding to the various throttle opening values are calculated by multiplying the last compensated duty cycle values by the calculated compensation ratio K. The thus updated relationship is obtained and stored in the backup RAM 84a. As described above, once the duty cycle of the solenoid valve 106 corresponding to the specific throttle opening θ1 is compensated, the relationship between the duty cycle and the throttle opening is compensated or updated for the entire range of the throttle opening. The compensated relationship is used for the next shifting from the 1st-speed position to the 2nd-speed position (for the next engaging action of the brake B2). This procedure is repeated each time the same shifting action of the transmission occurs.

The operation to compensate or update the duty cycle of the solenoid valve 104 for controlling the back pressure PA1 of the accumulator 116 for the clutch C2 (for shifting the transmission from the 2nd-speed position to the 3rd-speed position) is effected in the same manner as described above with respect to the duty cycle of the solenoid valve 106. Similarly, the duty cycles for solenoid valves for the other frictional coupling devices of the automatic transmission may be compensated. According to the present arrangement, each frictional coupling device of the automatic transmission exhibits consistent operating characteristics for the same engaging action (e.g., for an engaging action of the brake B2 to shift the transmission from the 1st-speed position to the 2nd-speed position) with the same throttle opening, irrespective of a variation of the torque of the engine 1, variations of the operating characteristics of the hydraulic control valves and other components of the hydraulic control circuits 86, variations of the dynamic friction coefficients $\mu d$ of the frictional coupling devices (e.g., brake B2 and clutch C2), and chronological changes of the engine 1, hydraulic control circuits 86 and frictional coupling device 40, 60.

Referring to the flow chart of FIGS. 6(A) and 6(B), an operation of the automatic transmission from the 1st-speed position to the 2nd-speed position will be described.

Figure 6A:
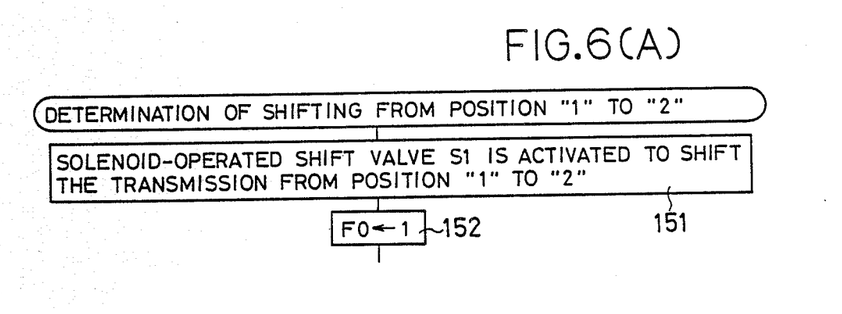
FIG. 6(A) a flow chart showing a main routine for shifting the automatic transmission.

Upon determination to initiate an engaging action of the brake B2 to shift the transmission from the 1st-speed position "1" to the 2nd-speed position "2", the control flow goes to step 151 of a main shift control routine of FIG. 6(A), wherein the solenoid-operated shift valve S1 is activated. Then, the control flow goes to step 152 to set a flag Fo to 1. The flag Fo indicates that the transmission is in the shifting motion from the 1st-speed position to the 2nd-speed position.

Figure 6B:
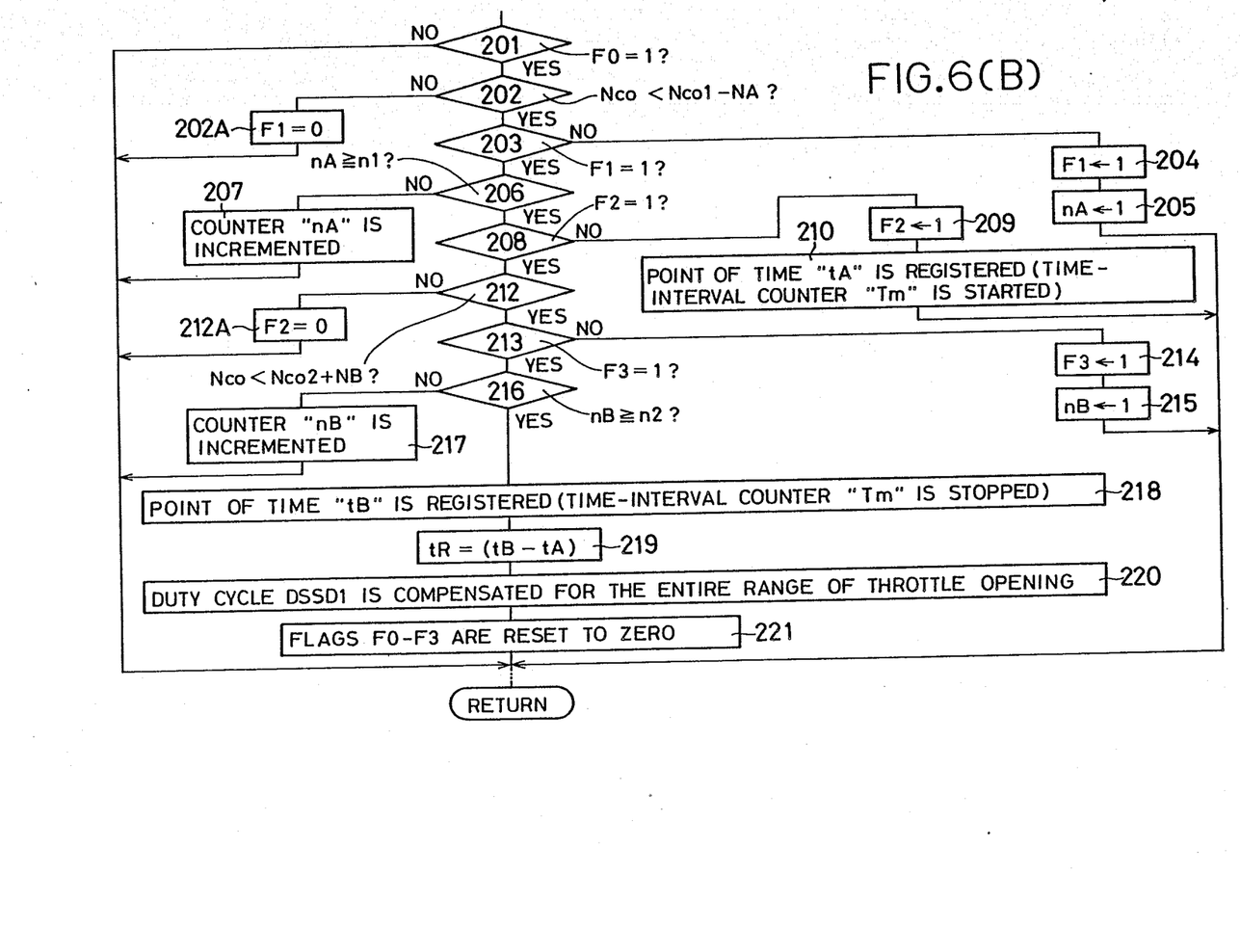
Figure 7A:
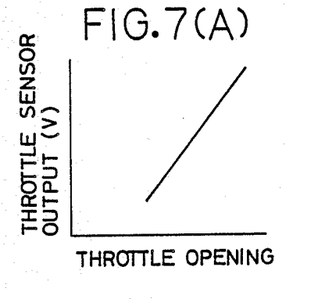
FIGS. 7(A)–7(D) are graphs showing relationships between two parameters of each of four different combinations associated with the regulation of the back pressure of the accumulator.
Figure 7B:
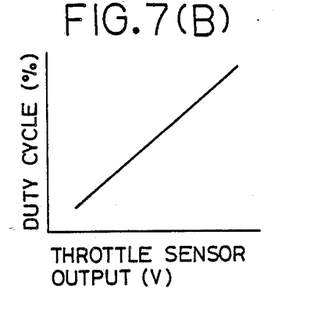
Figure 7C:
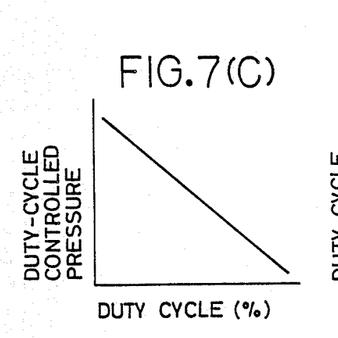
Figure 7D:
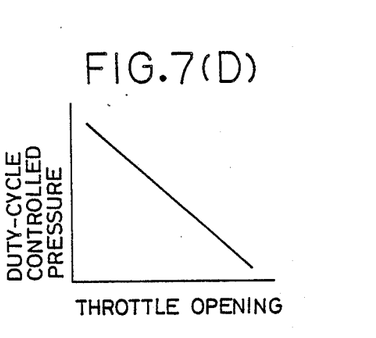

Referring to FIG. 6(B) illustrating a duty cycle compensation routine executed as part of the main routine of FIG. 6(A) after step 152, for compensating the duty cycle of the solenoid valve 106 for the brake B2.

Initially, step 201 is executed to determine whether the flag Fo is set at "1" or not. If the flag Fo is in the "0" state (If the transmission is not in the shifting motion from the 1st-speed position to the 2nd-speed position), the duty cycle compensating routine is terminated. If the flag is at "1", step 202 is implemented.

Steps 202-208 are executed to determine whether the brake B2 has started an engaging action, i.e., whether the speed Nco of the clutch C0 has started to be lowered at point tA (FIG. 5).

The above determination is made, for example, by comparing the currently detected speed Nco of the clutch C0 (equal to the speed of the turbine 22 of the torque converter 20), with a difference (Ncol−NA) between the speed Ncol of the clutch C0 when the transmission is in the 1st-speed position, and a predetermined speed value NA. More specifically, if the computer 84 consecutively determines a predetermined number (nl) of times that the currently detected speed Nco is smaller than the above-indicated difference (Ncol−NA), the computer 84 determines that the lowering of the clutch speed Nco has just been started, or that the point of time tA has just been reached. Since the boundary speed of the vehicle at which the transmission is automatically shifted from the 1st-speed position to the 2nd-speed position is determined by the currently detected throttle opening according to a predetermined shift pattern (stored in the computer 84), the speed Ncol of the clutch C0 in the 1st-speed position of the transmission is determined by the above-indicated boundary speed and the speed reduction ratio of the 1st-speed position.

The predetermined speed value NA is provided for accommodating an error of correspondence between the above-indicated boundary speed of the vehicle and the throttle opening. The above-indicated determination of Nco < Ncol−NA is effected for the predetermined number (nl) of times, for avoiding an erroneous determination.

Described more specifically, the above determination of Nco < Ncol−NA is implemented in step 202. If an affirmative decision (y) is obtained in step 202, the control flow goes to step 203 to determine whether a flag F1 indicative of the first affirmative decision in step 202 is set at "1" or not. Since this flag F1 is initially set at "0", step 203 is followed by step 204 in which the flag F1 is set to "1". Then, the control flow goes to step 205 in which a counter nA is set to "1".

If an affirmative decision (y) is again obtained in step 202 in the next control cycle, an affirmative decision (y) is obtained in the next step 203. Consequently, step 203 is followed by step 206 in which the computer 84 determines whether the content of the counter nA is equal to the predetermined value nl. For example, this value nl is set at "2", "3" or "4". At this point of time, a negative decision (n) is obtained in step 206, whereby the control flow goes to step 207 in which the counter nA is incremented. In the same manner as described above, the counter nA is incremented each time the determination of Nco < Ncol−NA is made in step 202 in each control cycle. If a negative decision (n) is obtained in step 202 before the inequality in step 202 is met the predetermined number (nl) of times, step 202A is executed to zero the flag F1.

When the content of the counter nA reaches the predetermined value nl, the computer 84 determines that the brake B2 has started its engaging action, namely, determines that the point of time tA has been reached. As a result, step S206 is followed by step 208.

In step 208, the computer 84 determines whether a flag F2 indicative of the first affirmative determination in step 206 is set at "1" or not. Since this flag F1 is initially set at "0", the control flow goes to step 209 to set the flag F2 to "1", and step 210 in which a time-interval counter Tm of the computer 84 is started. In other words, the point of time tA is registered in the computer 84. The time-interval counter Tm is incremented at regular intervals by the computer 84.

Steps 212-217 are implemented to determine whether the engaging action of the brake B2 has been terminated or not, i.e., whether the point of time tB (FIG. 5) has been reached. These steps 212-217 correspond to the steps 202-207 described above. Step 212 is different from the corresponding step 202 in that the inequality in step 202 is replaced by an inequality Nco<Nco2+NB in step 212, where Nco2 represents the speed of the clutch C0 when the transmission is in the 2nd-speed position, and NB represents a predetermined speed value. Further, step 216 is different from the corresponding step 206 in that the predetermined number nl in step 206 is replaced by a predetermined number n2 in step 216.

The speed Nco2 of the clutch C0 in the 2nd-speed position of the transmission is determined by the above-indicated boundary speed of the vehicle (at which the transmission is shifted from the 1st-speed position to the 2nd-speed position) and the speed reduction ratio of the 2nd-speed position. The predetermined speed value NB is provided primarily for accommodating an error of correspondence between the boundary shifting speed and the throttle opening. A flag F3 in step 213 has the same significance as the flag Fl in step 203. Step 212A corresponds to step 202A. Further, step 215 corresponds to step 205, and the incrementing operation of a counter nB in step 217 has the same significance as that of the counter nA in step 207. The counters nA and nB are both incorporated in the computer 84.

When the content of the counter nB reaches the predetermined value n2, the computer 84 determines that the brake B2 has completed the engaging action, namely, determines that the point of time tB has been reached. As a result, step 216 is followed by step 218 in which the point of time tB is registered. Namely, the time-interval counter Tm which has been started in step 210 is stopped in step 216. Step 218 is followed by step 219 in which the shifting or engaging time tR (=tB−tA) is determined based on the current content of the time-interval counter tB.

After the engaging time tR is obtained in step 219, the computer 84 compensates the duty cycle DSSD1 of the solenoid valve 106 for the brake B2 corresponding to the current throttle opening, according to the equation (1) indicated above. Further, the computer 84 compensates the duty cycle DSSD1 for the entire range of the throttle opening, namely, compensates the overall relationship between the duty cycle DSSD1 and the throttle opening, based on the duty cycle ratio K of the duty cycle compensated in the present control cycle to the basic duty cycle of FIG. 4 (or to the duty cycle compensated upon occurrence of the last shifting action). Then, step 221 is executed to reset the flags F0–F3.

It follows from the above description that upon determination of a shifting operation of the automatic transmission from the 1st-speed position to the 2nd-speed position, the point of commencement (tA) of the shifting action is determined and registered in step 210, and the point of termination (tB) of the shifting action is determined and registered in step 218. Then, the duty cycle DSSD1 of the solenoid valve 106 corresponding to the currently detected throttle opening is compensated based on the shifting time tR (tB−tA), and the basic relationship between the duty cycle DSSD1 and the throttle opening is compensated over the entire range of the throttle opening, such that the ratio of the compensation of the overall relationship is equal to that of the compensation of the duty cycle corresponding to the currently detected throttle opening. In this manner, the relationship between the duty cycle of the solenoid valve 106 and the throttle opening is compensated or updated over the entire range of the throttle opening, each time the shifting of the transmission from the 1st-speed position to the 2nd-speed position is determined or commanded by the computer 84. Accordingly, the hydraulic control apparatus 84, 86 assures optimum or ideal shifting characteristics of the automatic transmission 20, 40, 60 (more precisely, the frictional coupling device 40, 60), irrespective of variations in various operating conditions or environments of the transmission.

While the illustrated embodiment is adapted such that the relationship between the duty cycle and the throttle opening is updated for the entire range of the throttle opening in step 220, this step may be adapted such that only the duty cycle corresponding to the currently detected specific throttle opening at which the engaging action of the brake B2 is compensated in step 220.

The aforementioned manner of compensating the duty cycle of the solenoid valve 106 for the brake B2 as illustrated in FIGS. 6(A) and 6(B) is equally applicable to compensate the duty cycle of the solenoid valve 104 for the clutch C2 when the transmission is shifted from the 2nd-speed position to the 3rd-speed position.

Further, the principle of the present invention may be practiced for a shifting operation of the transmission from the 3rd-speed position to the 4th-speed position. However, this shifting action does not usually involve a large amount of shifting shock of the transmission. In this sense, the compensation of the duty cycle for the shifting from the 3rd-speed position to the 4th-speed position may be eliminated, and even the duty cycle regulation of the back pressures of the accumulators for the shifting operation in question may be eliminated for the shifting from the 3rd-speed position to the 4th-speed position.

Figure 10:
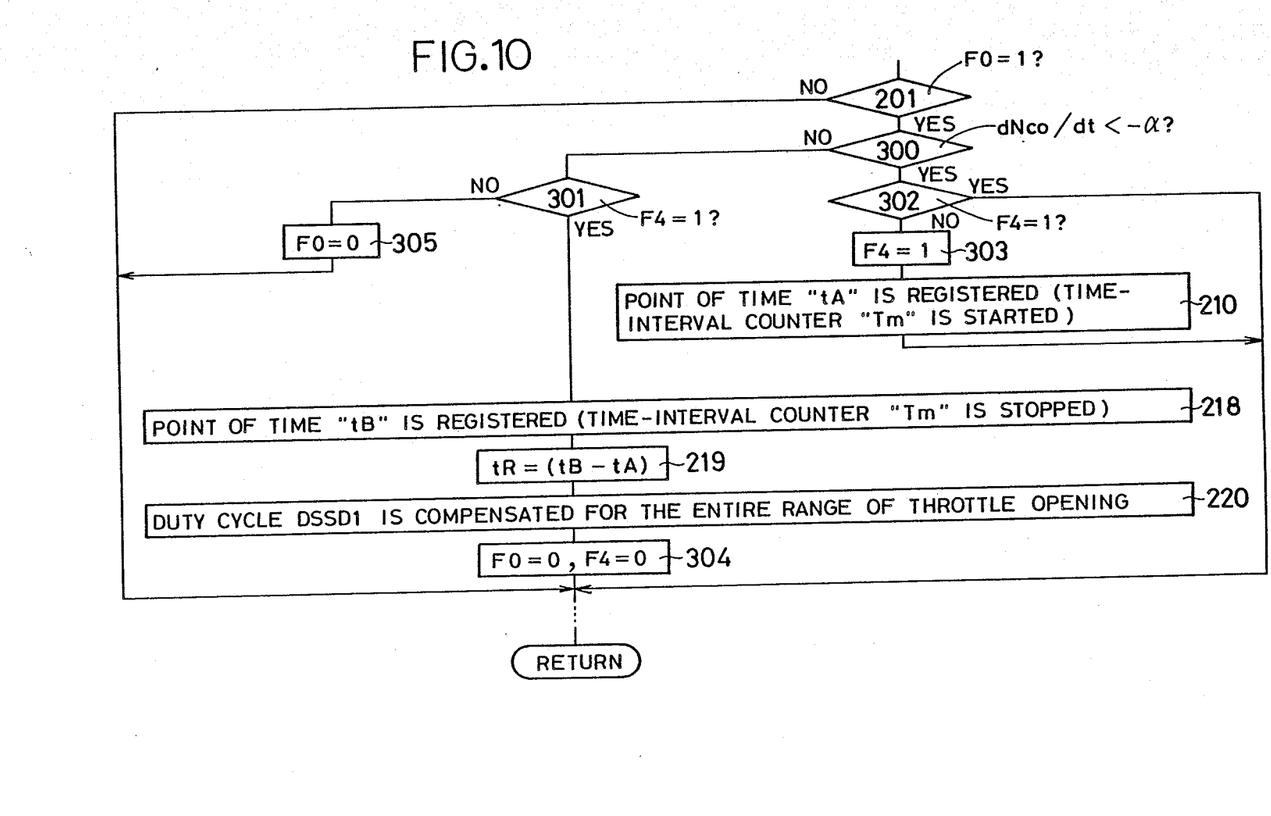
FIG. 10 is a flow chart illustrating another embodiment of the present invention.

A modified embodiment of the present invention will be described, by reference to the flow chart of FIG. 0, wherein the same reference numerals are used to identify the same process steps, which will not be described.

In the preceding embodiment, steps 202–212 are executed to determine the shifting time tR actually required for shifting of the transmission from the 1st-speed position to the 2nd-speed position, by measuring a length of time between the first point of time tA at which the the actual rotating speed Nco of the clutch C0 becomes lower than the 1st-speed position speed Nco1 of the clutch Co by the predetermined value NA, and the second point of time tB at which the rotating speed Nco becomes higher than the 2nd-speed position speed Nco2 plus the predetermined value NB. However, the shifting time tR may be determined based on a rate of variation (dNco/dt) in the actual rotating speed Nco of the clutch Co, as illustrated in FIG. 10.

In step 300, the computer 84 determines whether the rate of variation or acceleration rate (dNco/dt) of the actual rotating speed of the clutch Co is lower than a predetermined reference value −α. Where the reference value α is a positive value, step 300 may be modified to determine whether the rate of variation (dNco/dt) is higher than the reference value α. If an affirmative decision (YES) is obtained in step S300, step S302 is executed to determine whether flag F4 is equal to "1" or not. When this Flag F4 is "1", the flag indicates that the transmission is in a shifting action from the 1st-speed position to the 2nd-speed position. Since the flag F4 is initially "0", step S300 is followed by step 303 in which the flag F4 is set to "1". Then, the control flow goes to step S210 wherein the point of time tA is registered, and the counter Tm is started.

In the next control cycle, an affirmative decision (YES) is obtained in step 302, and steps 303 and 210 are skipped, and the control flow returns to step 201. When the rate of variation (dNco/dt) becomes higher than the predetermined reference value $-\alpha$ as a result of termination of the shifting action of the transmission from the 1st-speed to the 2nd-speed position, a negative decision (NO) is obtained in step 300. Then, the control flow goes to step 301 to determine whether flag F4 is equal to "1" or not. Since the flag F4 has been set to "1" in step 302, an affirmative decision (YES) is obtained in step 301, and the control flow goes to step 218 wherein the point of time tB is registered and the counter Tm is stopped. Thereafter, steps 219 and 220 are executed, whereby the time interval tR is calculated, and the duty cycle DSSD1 is compensated. Step 220 is followed by step 304 in which the flags F0 and F4 are both reset to "0".

While the present invention has been described in its presently preferred embodiment, it is to be understood that the invention is not limited to the precise details of the illustrated embodiment, and that the invention may be embodied with various changes, modifications and improvements, which may occur to those skilled in the art, without departing from the spirit and scope of the invention defined in the following claims.

What is claimed is:

1. A hydraulic control apparatus for controlling a hydraulically operated frictional coupling device of an automatic transmission connected to an engine of a motor vehicle, said hydraulic control apparatus including a shift valve for effecting an engaging action of said frictional coupling device from a first position to a second position, and means for automatically controlling a control value for regulating a hydraulic pressure applied to said frictional coupling device during said engaging action, based on a parameter associated with an output of said engine, and according to a predetermined relationship between said control value and said parameter, so as to reduce a shifting shock of said automatic transmission, said means for automatically controlling a control value comprising:

detecting means for detecting an engaging time during which said engaging action of said frictional coupling device from said first position to said second position is effected; and compensating means for updating said relationship depending upon the engaging time detecting by said detecting means, with respect to a specific value of said parameter at which said engaging action takes place, said compensating means maintaining the updated relationship for use for a subsequent occurrence of said engaging action of said frictional coupling device from said first position to said second position, said compensating means updating said relationship, with respect to an entire range of said parameter, based on said updated relationship with respect to said specific value of said paramenter, said compensating means maintaining the updated relationship with respect to said entire range of said parameter, for use for said subsequent occurrence of the engaging action.

2. A hydraulic control apparatus according to claim 1, further comprising a speed sensor for detecting a rotating speed of an input shaft of said automatic transmission or another rotating member rotated with said input shaft, and wherein said detecting means detects a first point of time at which said rotating speed of said input shaft or said rotating member starts to change, and a second point of time at which a change in said rotating speed is terminated, said detecting means determining a time interval between said first and second points of time, as said engaging time.

3. A hydraulic control apparatus according to claim 2, wherein said automatic transmission includes a torque converter disposed between said engine and said frictional coupling device, and said rotating member consists of a turbine of said torque converter.

4. A hydraulic control apparatus according to claim 2, wherein said frictional coupling device consists of a clutch rotated with said input shaft of the automatic transmission, and said rotating member consists of said clutch.

5. A hydraulic control apparatus according to claim 1, wherein said parameter is selected from the group consisting of an opening of a throttle valve of said engine, a reduced pressure in an intake manifold of said engine, a rate of flow of an intake air into said engine, an amount of injection of a fuel into said engine, and an amount of operation of an accelerator pedal of said vehicle.

6. A hydraulic control apparatus according to claim 1, further comprising a solenoid-operated valve whose duty cycle is controlled to regulate said back pressure of said accumulator, and wherein said engine is provided with a throttle valve, said compensating means updating said relationship between said control value and said parameter, according to the following equation:

$$DSSN1(\theta) \; DSSD1(\theta) + (1 - tR/tK) \; DSSD1B$$

where,

DSSD1: said duty cycle of said solenoid-operated valve $\theta$: an opening of said throttle valve, tR: said engaging time of said frictional coupling device, tK: an optimum engaging time of said frictional coupling device, DSSD1B: a compensation factor of said relationship.

7. A hydraulic control apparatus according to claim 6, wherein said compensation factor DSSD1B is a function of said opening of the throttle valve.

8. A hydraulic control apparatus according to claim 1, further comprising a speed sensor for detecting a rotating speed of an input shaft of said automatic transmission or another rotating member rotated with said input shaft, and wherein said detecting means detects said engaging time, based on a rate of variation in the rotating speed of said input shaft or said rotating member.

9. A hydraulic control apparatus according to claim 1, and further comprising an accumulator for reducing a change in said hydraulic pressure applied to said frictional coupling device, and wherein said means for automatically controlling a control value controls a back pressure of said accumulator.

10. A hydraulic control apparatus according to claim 9, and further comprising an accumulator control value for controlling said back pressure of said accumulator, and a solenoid valve communicating with said accumulator control valve, said means for automatically controlling a control value automatically controlling a duty cycle of said solenoid valve as said control value.

* * * * *